United States Patent

[11] 3,633,337

| [72] | Inventors | Alan B. Walker<br>West Allenhurst;<br>Herbert J. Hall, Skilliman, both of N.J. |
|---|---|---|
| [21] | Appl. No. | 819,227 |
| [22] | Filed | Apr. 25, 1969 |
| [45] | Patented | Jan. 11, 1972 |
| [73] | Assignee | Research-Cottrell, Inc.<br>Bridgewater Township, Somerset County, N.J. |

[54] GAS-HANDLING METHOD AND APPARATUS
6 Claims, 7 Drawing Figs.

[52] U.S. Cl. .................................................. 55/4,
23/2 R, 23/288 R, 55/13, 55/102, 55/107, 55/112,
55/118, 55/123, 55/131, 55/134, 55/136, 55/151,
55/154, 55/220, 165/186, 261/1
[51] Int. Cl. .................................................. B03c 3/00
[50] Field of Search .......................................... 55/2, 102,
107, 123, 136–139, 150, 4, 13, 112, 118, 131, 134,
151, 154, 220; 250/44; 204/317; 23/2 R, 288 R;
165/186; 261/1

[56] References Cited
UNITED STATES PATENTS

| 2,318,093 | 5/1943 | Penney | 204/317 X |
|---|---|---|---|
| 2,422,564 | 6/1947 | Pegg | 55/138 |
| 2,610,699 | 9/1952 | Penney et al. | 55/105 |
| 2,756,840 | 7/1956 | Maas | 250/44 X |
| 2,758,666 | 8/1956 | Prentiss | 55/107 X |
| 2,847,082 | 8/1958 | Roos | 55/139 X |
| 3,100,146 | 8/1963 | Huntington | 55/123 X |
| 3,218,431 | 11/1965 | Stauffer | 315/231 X |
| 3,443,087 | 5/1969 | Robieux | 55/2 X |

FOREIGN PATENTS

| 873,565 | 7/1961 | Great Britain | 55/102 |

*Primary Examiner*—Dennis E. Talbert, Jr.
*Attorney*—Stowell & Stowell

ABSTRACT: A method and apparatus for preventing deposition, on oppositely charged or grounded surfaces of heat exchangers, catalyst beds and the like, of gas stream carried charged particles issuing from electrostatic precipitators by neutralizing the effect of the charge on the particles downstream of the electrical precipitator particle collecting zone.

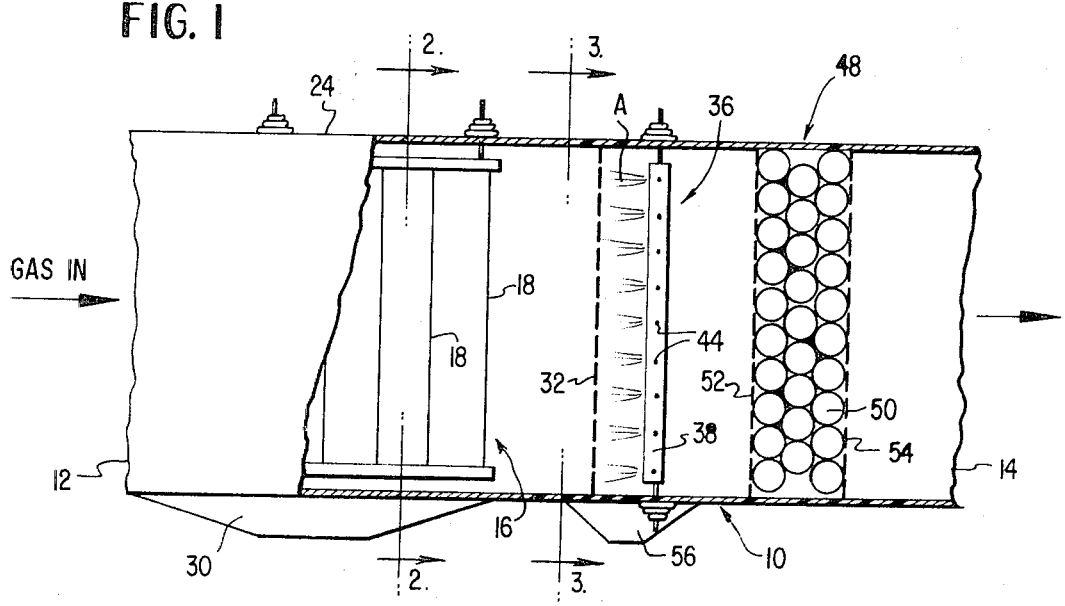
FIG. 1
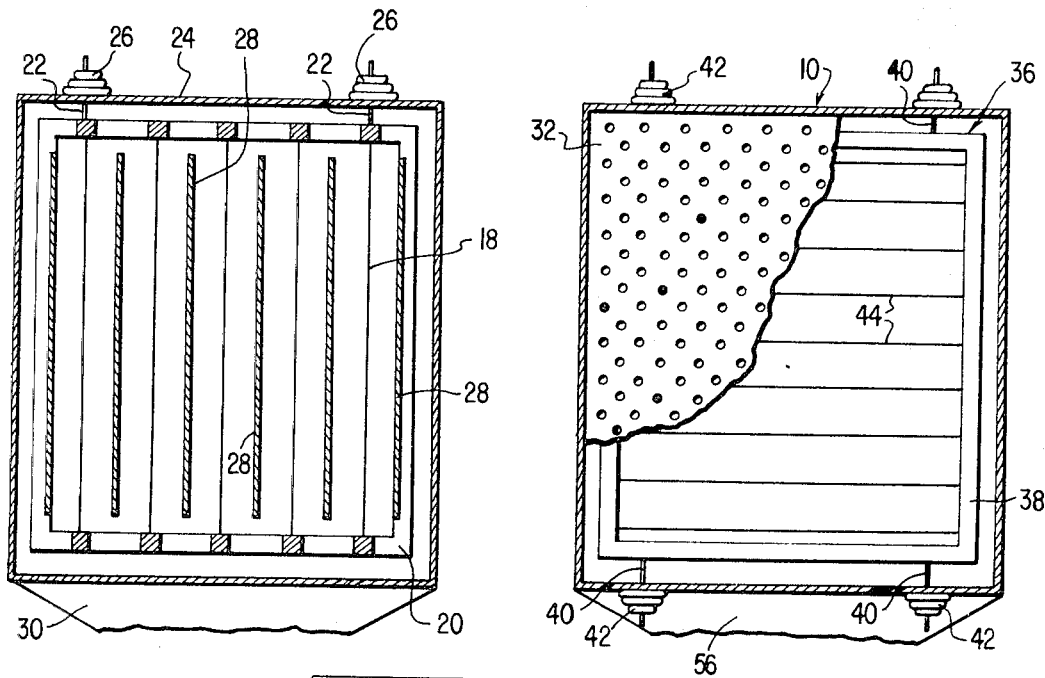
FIG. 2
FIG. 3
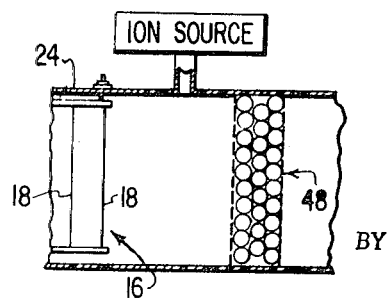
FIG. 3A
INVENTORS.
ALAN B. WALKER
HERBERT J. HALL
BY *Stowell & Stowell*
ATTORNEYS

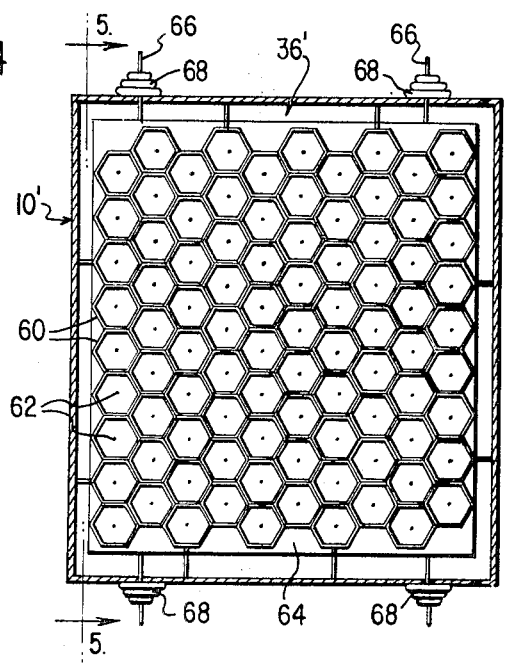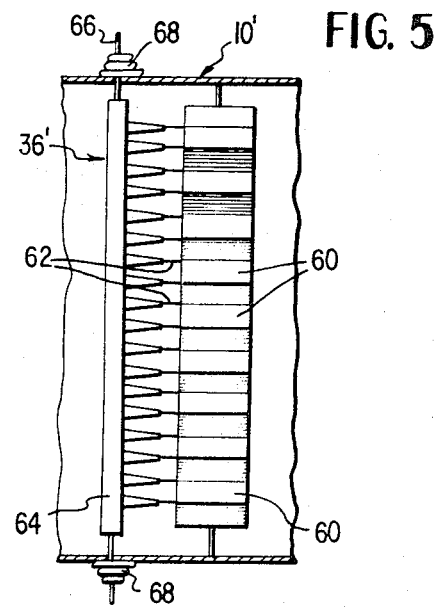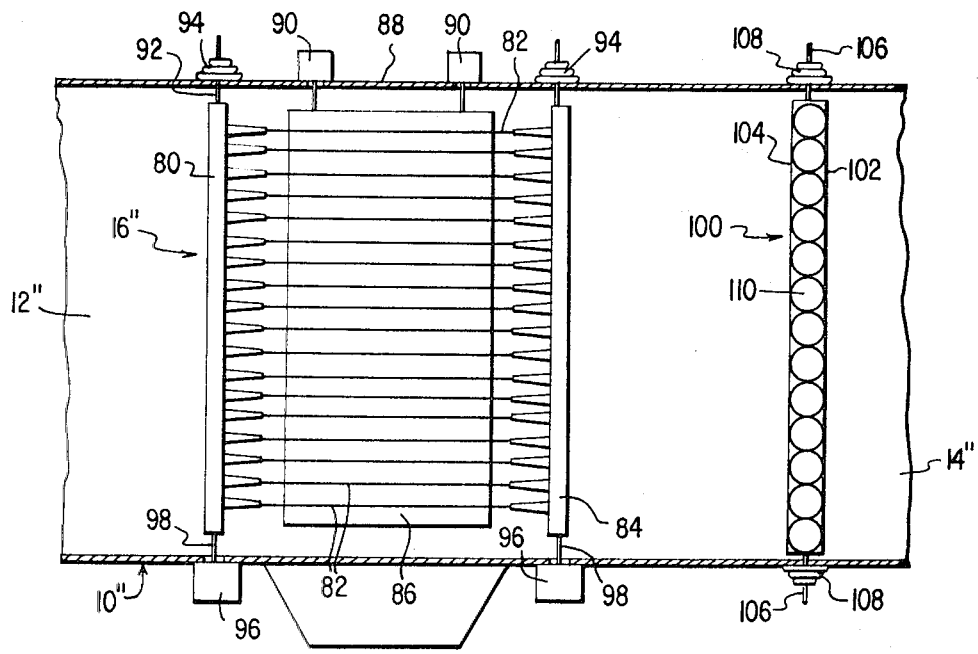

GAS-HANDLING METHOD AND APPARATUS

It is a principal object of the present invention to provide an improved method and apparatus for neutralizing the effect of an electrical charge on particles suspended in a gas stream downstream of an electrostatic-particle-collecting zone, to prevent deposition of the charged particles on oppositely charged or grounded surfaces such as catalyst beds, heat exchangers, packed towers, etc.

The deposition of suspended solids on solid, fixed, bed catalysts is one of the principal reasons for poisoning of catalysts particularly in catalytic oxidation processes for flue gas desulphurization. For example, high-efficiency electrostatic precipitation apparatus is often used for the removal of suspended fly ash from boiler flue gases prior to catalytic oxidation of the flue gas in order to extend the life of the catalyst bed. However, even at very high efficiency some residual fly ash carries over into the catalytic converter and necessitates the removal and cleaning of the bed at frequent intervals. It is, therefore, an object of the present invention to provide a method and apparatus for further extending the interval between the cleaning of catalytic oxidation beds and thereby substantially reduce the operating costs of such systems.

Material leaving an electrostatic precipitator is highly charged with the same polarity as the discharge electrodes in the precipitator. This charge on the particles induces a collecting field when such a charged particle approaches a grounded surface or an oppositely charged surface such as the surface of catalytic pellets in a catalytic oxidation bed. By eliminating the residual charge or by eliminating the effect of the charge on the particles as they leave the precipitator poisoning of the catalytic bed can be minimized if not substantially entirely eliminated so that the residual particles will pass through the bed rather than be collected on the catalyst.

The invention generally comprises a method of treating suspended particulate material in a gas stream comprising ionizing the suspended material, collecting the majority of the ionized particles on an oppositely charged collecting surface and thereafter neutralizing the effect of the charge on the particles suspended in the gas stream downstream of the particle-collecting zone.

The invention will be more particularly described in reference to the accompanying drawings wherein:

FIG. 1 is a fragmentary partial sectional view through apparatus suitable for carrying out the method of the invention;

FIG. 2 is a transverse section on line 2—2 of FIG. 1;

FIG. 3 is a transverse section on line 3—3 of FIG. 1;

FIG. 3A is a view similar to FIG. 1 showing a modification.

FIG. 4 is a view similar to FIG. 3 of a modified form of the present invention;

FIG. 5 is a section on line 5—5 of FIG. 4; and

FIG. 6 is a fragmentary sectional view of still a further form of apparatus suitable for carrying out the method of the present invention.

The residual charge on particles leaving an electrostatic precipitator can be removed by subjecting the particles to a source of ions of opposite polarity to those in the precipitator proper. Thus, with negative polarity precipitation the deionizer would comprise a source of positive ions. The ion density of the deionizer may be adjusted, either by manual adjustment of the deionizer voltage and current or automatically and continuously using a suitable residual charge sensor in such a manner that the deionizer will neutralize the negative charge on the particles thus eliminating any residual charge and promoting the passage of the particles through, for example, a downstream catalyst bed. Due to erosion from the surfaces of collecting plates, the gas stream downstream of the precipitator may contain particles of both charges.

Referring particularly to FIGS. 1, 2 and 3, apparatus suitable for carrying out the method is illustrated. In the drawing, 10 generally designates a conduit having a gas inlet end 12 and a gas outlet end 14. Adjacent the gas inlet end is an electrostatic precipitator unit generally designated 16. The precipitator, unit 16, includes fine wire discharge electrodes 18 suspended in a frame 20. The frame 20, carrying the discharge wires, is mounted within the duct 10 by electrical conducting rods 22 suspended from the top 24 of the duct 10 by conventional insulators 26. One or more of the conductors 22 is connected to a source of high-voltage electricity through conventional voltage control means as is well known in the art.

The unit 16 includes complementary extended surface plate-type collecting electrodes 28 which are mounted in parallel relationship uniformly spaced from the fine wire discharge electrodes 18 as more clearly shown in FIG. 2 of the drawing. The plates 28 are mounted from the top or sidewalls of the duct in conventional manner and the extended surface-collecting electrodes 28 and the discharge electrodes 18 may be provided with vibrators or rappers to remove collected particulate material therefrom as is well known in the art. The collected material following rapping of the plates and wires, would fall into the hopper section 30 formed below the electrostatic 16. Further, suitable baffles would be carried at least at the inlet end of the electrostatic precipitator to prevent gas sneakage about the collecting plates and discharge wires. The flow control baffles are not illustrated in the drawing as they are conventional in electrostatic precipitators.

Downstream of the conventional electrostatic precipitator unit 16 a flow control baffle 32 is positioned which is grounded to the conduit 10. Certain of the particles charged in the electrostatic unit 16 and which fail to be collected on the collecting plates 28 or which are resuspended in the gas stream during rapping of the plates, are collected on the baffle 32. The baffle 32, which is maintained at earth potential or the same potential as the collecting plates, functions to remove some of the charged particles which issue from the exit end of the precipitator unit 16 and these particles, collecting on the gas distribution plate, may be removed by rapping of the plate or providing a fluid flushing stream for the plates as is well known in the art. Particles which are not collected on the gas distribution plate 32 pass downstream to a deionizer section generally designated as 36. One form of the deionizer section 36, as more clearly shown in FIG. 3 of the drawing, comprises a frame 38 supported on conductors 40 carried by insulators 42. One or more of the conductors 40 is suitably connected to a high voltage system which may be an independent system or that employed in energizing the electrostatic precipitation unit 16. The frame 38 carries a plurality of fine wire discharge electrodes 44 which may be identical to the fine wire discharge electrodes 18 of the conventional electrostatic precipitation section 16. The fine wire discharge electrodes 44 in conjunction with the grounded gas distribution plate 32 function to provide corona discharge in the gas passage as illustrated by the lines designated 'A' in FIG. 1 of the drawing.

If the electrostatic precipitator unit 16 is connected to a source of high potential so that the discharge electrodes 18 produce a negative corona, then the fine wire electrodes 44 of deionizer section 36 are connected to the positive side of a high-voltage system to provide a positive corona discharge. This latter will neutralize the negative charge on the particles produced by the negative corona passing through the gas distribution baffle 32. In order to neutralize the effects of both positive and negatively charged particles in the stream downstream of the main precipitator, the wires 44 may be energized with alternating potential, to thereby generate ions of both charge types of neutralization. Suspended particles passing through the deionizer 36 pass to further gas-treating equipment which in the illustrated form on the invention comprises a catalytic oxidizer 48 for desulphurization of flue gases. The catalytic oxidizer 48 for consists of the catalyst 50 maintained between a pair of perforate plates 52 and 54. Where desired the plate 32 and its associated fine wire discharge electrodes 44 may be mounted above an auxiliary hopper generally designated 56 and a suitable rapping means may be provided for the plate 32 and the assembly 36.

Voltages and currents in the deionizer 36 under maximum operating conditions are at about 40 to 45 kv. peak and 120 milliamps DC.

From the foregoing description, it will be seen that the apparatus illustrated in FIGS. 1, 2 and 3 will provide means for neutralizing the effect of a charge on particles existing for an electrostatic precipitator.

The form of the deionizer or the ion source is not particularly critical as long as a suitable source of ions to neutralize the charge on the charged particles is provided. For example, in FIG. 4 the deionizer section 36' consists of a plurality of hexagonal pipes 60 each of which has a diameter of about 6 inches and a minimum length of, for example, about 1 inch. Mounted centrally in each of the ducts is a fine wire electrodes 62. Each of the fine wire discharge electrodes 62 is connected to a suitable source of energizing electric current via a framework 64 supported by suitable support rods 66 mounted to the outer walls of the duct 10' via electrical insulators 68.

In view of the short length of the grounded pipes 60 they may be mounted with their longitudinal axis in a horizontal plane without providing means for removing particles which might collect within the tubes. However, suitable rapping means may be provided for the discharge electrode frame 64 and for the pipe assembly 60.

It will be understood that sources of ions of suitable polarity, such as radioactive emitters, laser beams, electron emitters, and the like may be used instead of corona. Also the source of ions, whether by corona or other means, can be located externally to the conduit 10 of FIG. 1 and the ions introduced between the precipitator outlet and the collecting surface. This is illustrated in FIG. 3A of the drawings, where a suitable source of the desired polarity of ions indicated as feeding in ions to the gas stream, downstream of the main precipitator.

As herein before discussed, the charge on the particles issuing from an electrostatic precipitator may be effectively neutralized by impressing a charge equivalent to the charge on the particle on the catalytic bed, heat exchanger, packed tower or the like. In FIG. 6 of the drawing, apparatus for carrying out this aspect of the method is illustrated. In FIG. 6 the duct 10" comprises a gas flow passage having a gas inlet end 12" and a gas exit and 14". Adjacent the inlet end 12" is mounted a front support frame 80 from a plurality of fine wire discharge electrodes 82. The rearward ends of the discharge wires 82 are mounted to a similar frame 84 downstream of the trailing edges of collecting plate-type electrodes 86. The collecting plates 86 are mounted to the upper wall 88 of the duct 10" and the mounting means are provided with conventional pneumatic or magnetic impulse rappers. Each of the fine wire discharge electrode frames 80 and 84 is supported from the duct 10" by conductors 92 supported from electrical insulators 94. Certain of the conductors 92 would be connected to a source of energizing electric current as herein described with reference to the form of the invention illustrated in FIG. 1.

Further, each of the frame 80 and 84 may be connected to a suitable rapping mechanism illustrated as box 96, connected to the high-tension frames by insulated rapper rods 98. The reader will recognize this portion of the FIG. 6 arrangement to be conventional. Downstream from the electrostatic precipitator unit 16" there is illustrated a container 100 having perforated walls 102 and 104 through which the gas stream may pass. The walls are generally at right angles to the gas flow. The container 100 is maintained in spaced relationship from the grounded walls of the duct 10" by electrical conductors 106 supported from the duct 10' by electrical insulators 108. At least one of the conductors 106 is connected to a source of high potential electric current of the same polarity as the discharge electrodes 82 of the electrostatic precipitator unit 16" whereby charged particles carrying, for example, a negative charge are repelled by the negative charge maintained on the catalyst bed 110 within the container 100.

If the discharge electrodes 82 of the electrostatic precipitator unit 16" were energized with positive polarity, direct current for example, then the container and the catalyst bed 100 and 110 would be energized by a positive current whereby charged particles failing to be collected on the collecting plates 86 of the unit 16" would be repelled from the container 100 and from the catalyst 110 maintained within the container.

From the foregoing description of several forms of apparatus for carrying out the present invention, it will be seen that the objects and advantages hereinbefore set forth are fully accomplished. It will be appreciated by those skilled in the art that various modifications may be made in the specific form of the apparatus without departing from the scope of the appended claims.

We claim:

1. A method of treating suspended particulate material in a gas stream which is to be cleaned by a catalyst bed comprising ionizing the suspended material collecting the majority of the ionized particles on an oppositely charged collecting surface in a particle-collecting zone and thereafter neutralizing the effect of the charge on the remaining particles suspended in the gas stream downstream of the particle collecting zone by subjecting the remaining particles to mixtures of positive and negative ions generated in a corona discharge energized by an unrectified alternating voltage.

2. The method defined in claim 1 wherein neutralization of the effect of the charge on the remaining suspended particles is also effected by maintaining a repelling charge on surfaces generally perpendicular to the gas flow downstream of the collecting zone.

3. A method of deionizing particulate matter suspended in a gas stream after the substantial portion of the suspended matter has been removed by electrical precipitation; comprising creating an electrical zone of both positive and negative ions substantially entirely across the gas stream by applying high-voltage alternating current in a plurality of spaced-apart paths to form substantially continuous corona across the gas stream containing the charged suspended particulate matter of both positive and negative polarities.

4. The method as defined in claim 3 further including the step of collecting charged suspended particulate matter of one of the polarities by attracting said suspended particulate matter of said one polarity to a grounded surface located within and substantially across the gas stream upstream of the said electrical zone.

5. Apparatus for treating particulate matter suspended in a gas stream comprising
   a housing having a gas stream inlet and a spaced gas stream outlet;
   an electrostatic precipitator including discharge and collecting electrodes in said housing down stream of the gas stream inlet for removing a substantial portion of the suspended particulate matter from the gas stream;
   means for deionizing charged particulate matter not removed by the electrostatic precipitator;
   said deionizing means including a plurality of spaced conductors positioned across the housing transverse to the direction of gas flow and downstream of the electrostatic precipitator;
   and means for applying a high-voltage unrectified alternating current to each of the spaced conductors at a potential to establish a substantially continuous corona across the housing to neutralize the charge on the suspended particulate matter.

6. The apparatus defined in claim 5 further including an extended surface conductive member having a plurality of gas flow passages therethrough,
   and means mounting said member across the housing between the electrostatic precipitator and the said plurality of spaced conductors, said mounting means including an electrically conductive path between the extended conductive member and the housing.

* * * * *